Patented May 29, 1951

2,555,265

UNITED STATES PATENT OFFICE 2,555,265

LOW-VISCOSITY DRILLING MUDS

William E. Bergman, Bartlesville, Okla., assignor to Phillips Petroleum Company, a corporation of Delaware No Drawing. Application September 19, 1949, Serial No. 116,629

18 Claims. (Cl. 252—8.5)

This invention relates to water-base drilling muds. In one aspect, it relates to a method of controlling the rheological properties of water-base drilling muds. In another aspect, it relates to a water-base drilling mud having controlled rheological properties.

In the art of drilling wells, especially drilling by the rotary method, it is necessary to use a drilling mud, as is well understood in the art. The drilling mud lubricates the drill stem, carries the cuttings to the surface of the well, and forms a filter cake on the walls of the well preventing the loss of at least any substantial amount of water from the drilling mud to the natural formations penetrated. In order to perform these important functions properly, the drilling mud must have suitable viscosity, gel strengths, and other qualities at all times in spite of adverse conditions encountered in drilling the well.

One of the difficulties encountered in drilling with water-base drilling muds is the undesirable increase in viscosity and gel strengths brought about by contamination of the drilling mud with electrolytes present in the formations penetrated. In order to prevent the viscosity rise, or to reduce the viscosity of a drilling mud, the usual practice is to add quebracho and caustic soda. No satisfactory substitute for quebracho has been found prior to my discovery.

Quebracho is the extract of the wood of the quebracho tree which grows in South America. Since no satisfactory substitute for quebracho has been discovered, a shutting off of this foreign supply could injure the entire oil drilling business.

I have discovered a material which can replace quebracho in water-base drilling muds, and which is readily available in large quantities.

An object of my invention is to provide an additive for controlling the rheological properties of drilling muds.

Another object is to provide a method of controlling the rheological properties of water-base drilling muds.

Another object is to provide a method of obtaining a quebracho substitute from a domestic source.

Other objects and advantages of my invention will be apparent to those skilled in the art upon reading the following detailed description and claims.

The necessity for having a domestic source of quebracho or a quebracho substitute is, of course, obvious to those familiar with the art of well drilling. I have discovered that the rheological properties of drilling muds may be effectively controlled by the use of caustic soda and quinone or quinhydrone. A sufficient amount of caustic should be added to maintain the pH of the mud above 7.0 and preferably above about 10.0. A drilling mud having a high pH is more easily controlled than one with a low pH.

While quinone and quinhydrone are effective in controlling the rheological properties of water-base drilling muds, the effectiveness of each can be enhanced by aerating the additive in solution before adding it to the mud or by aerating the drilling mud after the addition has been made.

Since water-base drilling muds must plaster the walls of the well and prevent loss of water to the formations penetrated as well as perform the functions already described, a number of ingredients must be used. Ordinarily, a certain amount of suspended solids is added in the form of clay along with a smaller amount of a colloidal type clay, such as bentonite. To prevent the loss of water to the formations by filtration through the filter cake, the usual practice is to add a small amount, from 1 to 4 pounds per barrel of mud, of a water-loss reducer. Examples of these derivatives are sodium carboxymethylcellulose, cellulose acid sulfate, metal cellulose-alkyl sulfonates, and sodium oxycellulose.

My rheological control agents are compatible with all water-loss reducers or weighting agents normally used in drilling muds. My additives are also resistant to attack by contaminants encountered in drilling. Examples of these are sodium chloride, and anhydrite. My drilling muds are also stable to conditions of heat or cold normally encountered in drilling.

The addition of these rheological control agents to the drilling muds can be carried out in several ways. The usual practice is to add them to the drilling mud after the drilling has started. A water solution of the quinone or quinhydrone and the required amount of caustic may be added directly to the mud pit. If desired, the solution may be aerated before adding it to the drilling mud or the entire mixture may be aerated after the addition. The ingredients may be added separately, either in solution or in powder form, to the drilling mud in the pit. The method of addition can be varied and any convenient method which results in thorough mixing may be employed.

The amount of quinone or quinhydrone added to the drilling mud can be varied considerably. Small amounts give small changes and larger amounts result in greater changes. However, above about 4 pounds of additive per barrel of drilling mud, the addition of further amounts of the additive does not result in appreciable changes in the rheological properties.

My invention will be more clearly understood from the following example.

*Example*

For each test, aliquots of a solution containing 20 grams per liter of each of the additive and caustic soda were diluted to 25 ml. and added to 325 ml. of a 6% suspension of bentonite and water. The viscosity, gel strengths, and pH were determined for each sample according to the procedure described in API Code 29. Duplicate simples of each concentration were prepared and were handled according to technique A or technique B, as indicated in the following table. For technique A, contact between the treating solution and air was prevented insofar as was possible. For technique B, the treating solutions were aerated before use. The treating solutions were added to the base mud and the mixtures were stirred for 10 to 15 minutes. Those muds containing the aerated additive were not protected from air during the stirring (technique B). During the stirring of those muds containing the non-aerated solutions, contact between the mud and air was minimized by blowing a stream of nitrogen over the sample during the stirring.

The results of these tests are indicated in the following table.

| Additive | Additive, lb./bbl. | NaOH, lb./bbl. | Technique | Viscosity, cps. | Initial gel strength, g. | 10 Min. gel strength, g. | pH of Mud |
|---|---|---|---|---|---|---|---|
| None | 0 | 0.0 | B | 23.5 | 0 | 20 | 8.5 |
| Do | 0 | 0.25 | B | 72 | 30 | 110 | 11.6 |
| Do | 0 | 0.50 | B | Plastic | | | 12.1 |
| Do | 0 | 1.00 | B | Plastic | | | 12.5 |
| Quinone | 0.25 | 0.25 | A | 28 | 1 | 25 | 10.9 |
| Do | 0.25 | 0.25 | B | 23.5 | 0 | 25 | 11.1 |
| Do | 0.50 | 0.50 | A | 23 | 0 | 25 | 11.4 |
| Do | 0.50 | 0.50 | B | 23 | 0 | 25 | 11.4 |
| Do | 1.00 | 1.00 | A | 31 | 7 | 25 | 12.1 |
| Do | 1.00 | 1.00 | B | 22 | 0 | 20 | 11.9 |
| Quinhydrone | 0.25 | 0.25 | A | 23 | 1 | 35 | 10.7 |
| Do | 0.25 | 0.25 | B | 22 | 0 | 25 | 10.5 |
| Do | 0.50 | 0.50 | A | 23 | 0 | 25 | 11.3 |
| Do | 0.50 | 0.50 | B | 18 | 0 | 20 | 11.0 |
| Do | 1.00 | 1.00 | A | 26 | 4 | 35 | 11.9 |
| Do | 1.00 | 1.00 | B | 14 | 0 | 10 | 11.8 |

My invention is not limited to any particular mud system or to any particular combination of additives. It is effective in any water-base drilling mud in which it is desired to use an agent to control the rheological properties. Variations in the composition of the drilling muds are entirely within the scope of my invention, which is defined by the following claims.

Having described by invention, I claim:

1. A water-base drilling mud comprising, in combination, sufficient water to maintain the mixture fluid, sufficient clayey material to form a filter cake on the wall of the well, a sufficient amount of caustic alkali to maintain the mud alkaline, and a sufficient amount of a quinoid compound selected from the group consisting of quinone and quinhydrone to maintain the viscosity of the mud low enough that it can be circulated.

2. A water-base drilling mud comprising, in combination, sufficient water to maintain the mixture fluid, sufficient suspended solids to form a filter cake on the wall of the well, a sufficient amount of alkali to maintain the mud alkaline, and a sufficient amount of a quinoid compound selected from the group consisting of quinone and quinhydrone to maintain the viscosity of the mud low enough that it can be circulated.

3. A water-base drilling mud comprising, in combination, sufficient water to maintain the mixture fluid, sufficient clayey material to form a filter cake on the wall of the well, a sufficient amount of a dispersing agent and water-loss reducer to maintain a suitable water-loss, a sufficient amount of caustic alkali to maintain a pH above 7.0 and a sufficient amount of a quinoid compound selected from the group consisting of quinone and quinhydrone to maintain the viscosity of the mud low enough that it can be circulated.

4. A water-base drilling mud comprising, in combination, sufficient water to maintain the mixture fluid, sufficient suspended solids to form a filter cake on the wall of the well, a sufficient amount of a dispersing agent and water-loss reducer to maintain a suitable water-loss, a sufficient amount of caustic alkali to maintain a pH above 7.0, and a sufficient amount of a quinoid compound selected from the group consisting of quinone and quinhydrone to maintain the viscosity of the mud low enough that it can be circulated.

5. A water-base drilling mud comprising, in combination, sufficient water to maintain the mixture fluid, sufficient clayey material to form a filter cake on the wall of the well, sufficient alkali to maintain the mud alkaline, and a sufficient amount of a quinoid compound selected from the group consisting of quinone and quinhydrone to maintain the viscosity of the mud low enough that the mud can be circulated, said quinoid compound having been dissolved in water and aerated prior to use.

6. A water-base drilling mud comprising, in combination, sufficient water to maintain the mixture fluid, sufficient suspended solids to form a filter cake on the wall of the well, sufficient alkali to maintain the mud alkaline, and a sufficient amount of a quinoid compound selected from the group consisting of quinone and quinhydrone to maintain the viscosity of the mud low enough that the mud can be circulated, said quinoid compound having been dissolved in water and aerated prior to use.

7. A water-base drilling mud comprising, in combination, sufficient water to maintain the mixture fluid, sufficient clayey material to form a filter cake on the wall of the well, sufficient alkali to maintain the solution alkaline, and a sufficient amount of quinone to maintain the viscosity of the mud low enough that the mud can be circulated.

8. A water-base drilling mud comprising, in combination, sufficient water to maintain the mixture fluid, sufficient clayey material to form a filter cake on the wall of the well, sufficient alkali to maintain the solution alkaline, and a sufficient amount of quinhydrone to maintain the viscosity of the mud low enough that the mud can be circulated.

9. A water-base drilling mud comprising, in combination, sufficient water to maintain the mixture fluid, sufficient clayey material to form a filter cake on the wall of the well, sufficient alkali to maintain the solution alkaline, and a sufficient amount of quinone to maintain the viscosity of the mud low enough that the mud can be circulated, said quinone having been aerated in aqueous solution prior to adding to the mixture.

10. A water-base drilling mud comprising, in combination, sufficient water to maintain the mixture fluid, sufficient clayey material to form a filter cake on the wall of the well, sufficient alkali to maintain the solution alkaline, and a sufficient amount of quinhydrone to maintain the viscosity of the mud low enough that the mud can be circulated, said quinhydrone having been aerated in aqueous solution prior to adding to the mixture.

11. A water-base drilling mud comprising, in combination, sufficient water to maintain the mixture fluid, sufficient clayey material to form a filter cake on the wall of the well, sufficient alkali to maintain the solution alkaline, and a sufficient amount of quinone to maintain the viscosity of the mud low enough that the mud can be circulated, said mud having been aerated after the quinone addition.

12. A water-base drilling mud comprising, in combination, sufficient water to maintain the mixture fluid, sufficient clayey material to form a filter cake on the wall of the well, sufficient alkali to maintain the solution alkaline, and a sufficient amount of quinhydrone to maintain the viscosity of the mud low enough that the mud can be circulated, said mud having been aerated after the quinhydrone addition.

13. In a process for drilling a well with well drilling tools wherein there is circulated through said well a water base drilling mud containing colloidal particles of clayey material suspended in sufficient water to render the same normally circulatable, the improved process of circulating said mud in said well without permitting it to increase in viscosity to such an extent as to become uncirculatable which comprises maintaining said mud at a pH above 7.0, admixing with said mud and interacting therewith a sufficient amount of a quinoid selected from the group consisting of quinone and quinhydrone to maintain the viscosity of the mud low enough that the mud can be circulated, blowing the resulting mud with air prior to use and then circulating the resulting mud through said well.

14. In a process for drilling a well with well drilling tools wherein there is circulated through said well a water base drilling mud containing colloidal particles of clayey material suspended in sufficient water to render the same normally circulatable, the improved process of circulating said mud in said well without permitting it to increase in viscosity to such an extent as to become uncirculatable which comprises maintaining said mud at a pH above 7.0, dissolving a quinoid selected from the group consisting of quinone and quinhydrone in water, aerating the resulting solution, admixing with said mud and interacting therewith a sufficient amount of the resulting aerated solution of said selected quinoid to maintain the viscosity of the mud low enough that the mud can be circulated and circulating the resulting mud through said well.

15. The process of claim 14 wherein said quinoid is quinone.

16. The process of claim 14 wherein said quinoid is quinhydrone.

17. In a process for drilling a well with well drilling tools wherein there is circulated through said well a water base drilling mud containing colloidal particles of clayey material suspended in sufficient water to render the same normally circulatable, the improved process of circulating said mud in said well without permitting it to increase in viscosity to such an extent as to become uncirculatable which comprises admixing with said mud and interacting therewith a sufficient amount of alkali to maintain the mud alkaline and a sufficient amount of a quinoid selected from the group consisting of quinone and quinhydrone to maintain the viscosity of the mud low enough that the mud can be circulated and circulating the resulting mud through said well.

18. In a process for drilling a well with well drilling tools wherein there is circulated through said well a water base drilling mud containing suspended solids in sufficient water to render the same normally circulatable, the improved process of circulating said mud in said well without permitting it to increase in viscosity to such an extent as to become uncirculatable which comprises admixing with said mud and interacting therewith a sufficient amount of alkali to maintain the mud alkaline and a sufficient amount of a quinoid selected from the group consisting of quinone and quinhydrone to maintain the viscosity of the mud low enough that the mud can be circulated and circulating the resulting mud through said well.

WILLIAM E. BERGMAN.

REFERENCES CITED

The following references are of record in the file of this patent:

UNITED STATES PATENTS

| Number | Name | Date |
|---|---|---|
| 2,333,133 | Wayne | Nov. 2, 1943 |